(12) United States Patent
Michalkiewicz et al.

(10) Patent No.: US 12,734,752 B2
(45) Date of Patent: Sep. 15, 2026

(54) 3D PRINTER WITH HEAD CARRIAGE WITH FILAMENT CUTTER AND REMOVABLE PRINT HEAD

(71) Applicant: Stratasys, Inc., Minnetonka, MN (US)

(72) Inventors: Ross Michalkiewicz, Minneapolis, MN (US); Dang Yang, Champlin, MN (US); Colin Schiel, Chaska, MN (US); Jeff Lee Chapman, New Prague, MN (US)

(73) Assignee: Stratasys, Inc., Minnetonka, MN (US)

( * ) Notice: Subject to any disclaimer, the term of this patent is extended or adjusted under 35 U.S.C. 154(b) by 230 days.

(21) Appl. No.: 18/646,331

(22) Filed: Apr. 25, 2024

(65) Prior Publication Data

US 2024/0359404 A1 Oct. 31, 2024

Related U.S. Application Data

(60) Provisional application No. 63/498,428, filed on Apr. 26, 2023.

(51) Int. Cl.

*B29C 64/118* (2017.01)
*B29C 64/209* (2017.01)
*B29C 64/25* (2017.01)
*B33Y 30/00* (2015.01)

(52) U.S. Cl.

CPC ............ *B29C 64/209* (2017.08); *B29C 64/25* (2017.08); *B33Y 30/00* (2014.12)

(58) Field of Classification Search

CPC ..... B29C 64/209; B29C 64/25; B29C 64/106; B29C 64/118; B29C 64/321; B29C 2793/00; B29C 2793/0027; B29C 2793/0081; B29C 2793/009; B33Y 30/00; B33Y 40/00

See application file for complete search history.

(56) References Cited

U.S. PATENT DOCUMENTS 5,866,058 A 2/1999 Batchelder et al.
6,153,034 A 11/2000 Lipsker
6,547,995 B1 4/2003 Comb (Continued)

FOREIGN PATENT DOCUMENTS

CN 218577002 U 3/2023
WO 2019038491 A1 2/2019

*Primary Examiner* — Galen H Hauth
*Assistant Examiner* — Baileigh Kate Darnell
(74) *Attorney, Agent, or Firm* — Westman, Champlin & Koehler, P.A.

(57) ABSTRACT

An extrusion-based 3D printer configured to print 3D parts in a layer-by-layer manner includes a platen configured to accept and support extruded material, at least one print head configured to extrude material to print a 3D part and a gantry configured to move the at least one print head as the material is extruded. The 3D printer includes at least one head carriage configured to engage the at least one print head. The at least one carriage is configured to engage and retain the at least one print head, where a filament cutter positioned above the at least one print head. The filament cutter includes a blade configured to be moved by the user, such that the blade is positionable between a non-cutting position where filament can be fed to the at least one print head and a cutting position wherein the filament is cut above the print head.

19 Claims, 17 Drawing Sheets

(56) References Cited

U.S. PATENT DOCUMENTS 7,297,304 B2 11/2007 Swanson et al.
8,153,182 B2 4/2012 Comb et al.
8,157,202 B2 4/2012 Taatjes et al.
9,022,769 B2 5/2015 Swanson et al.
9,126,365 B1 9/2015 Mark et al.
9,126,367 B1 9/2015 Mark et al.
9,156,205 B2 10/2015 Mark et al.
9,168,698 B2 10/2015 Kemperle et al.
9,186,848 B2 11/2015 Mark et al.
9,327,452 B2 5/2016 Mark et al.
9,511,543 B2 12/2016 Tyler
9,931,778 B2 4/2018 Bogucki et al.
9,987,798 B2 6/2018 Tyler
10,040,240 B1 8/2018 Tyler
10,040,252 B2 8/2018 Mark
10,201,931 B2 2/2019 Batchelder et al.
10,201,941 B2 2/2019 Evans et al.
10,213,957 B2 2/2019 Tyler
10,232,551 B2 3/2019 Tyler
10,259,160 B2 4/2019 Mark
10,315,355 B2 6/2019 Tyler
10,315,356 B2 6/2019 Tyler
10,343,330 B2 7/2019 Evans et al.
10,421,268 B2 9/2019 Batchelder et al.
10,434,702 B2 10/2019 Mark et al.
10,518,490 B2 12/2019 Wicker et al.
10,556,381 B2 2/2020 Kemperle et al.
10,611,082 B2 4/2020 Mark et al.
10,717,228 B2 7/2020 Mark et al.
10,744,707 B2 8/2020 Tyler
10,744,708 B2 8/2020 Tyler
10,857,729 B2 12/2020 Alfson et al.
10,901,386 B2 1/2021 Stockett et al.
10,919,222 B2 2/2021 Alfson et al.
11,052,603 B2 7/2021 Hambling et al.
11,065,861 B2 7/2021 Mark et al.
11,097,440 B2 8/2021 Sauti et al.
11,104,059 B2 8/2021 Bheda
11,109,453 B2 8/2021 Tyler
11,130,285 B2 9/2021 Tyler
11,148,409 B2 10/2021 Mark et al.
11,167,495 B2 11/2021 Alfson et al.
11,173,660 B2 11/2021 Tyler
11,390,033 B2 7/2022 Bosveld et al.
11,465,335 B2 10/2022 Manuel
11,485,085 B2 11/2022 Smith et al.
11,919,242 B2 3/2024 Bosveld et al.
11,994,412 B2 5/2024 Bosveld et al.
12,168,322 B2 12/2024 Anderson et al.
2015/0290875 A1 10/2015 Mark et al.
2016/0144566 A1 5/2016 Mark et al.
2017/0151728 A1 6/2017 Kunc et al.
2017/0173868 A1 6/2017 Mark
2018/0056606 A1* 3/2018 Hoffman ................. B29C 64/20
2018/0056608 A1* 3/2018 Dunn .................... B29C 64/118
2018/0065317 A1 3/2018 Tyler
2019/0202130 A1 7/2019 Alfson et al.
2019/0232550 A1 8/2019 Mark et al.
2019/0315058 A1 10/2019 Budge et al.
2019/0315059 A1 10/2019 Budge et al.
2020/0001522 A1 1/2020 Manuel
2020/0086574 A1 3/2020 Budge et al.
2020/0086587 A1 3/2020 Hambling et al.
2020/0101662 A1 4/2020 Hu
2020/0238609 A1 7/2020 Stranberg
2020/0238619 A1 7/2020 Brodie et al.
2020/0238627 A1 7/2020 Morris et al.
2021/0060764 A1 3/2021 Kugler et al.
2021/0072715 A1 3/2021 Stockett et al.
2021/0170670 A1 6/2021 Barr et al.
2021/0197490 A1 7/2021 Budge et al.
2021/0260821 A1 8/2021 Stranberg et al.
2022/0001613 A1* 1/2022 Chapman .............. B29C 64/232
2022/0016837 A1 1/2022 PeKarna et al.
2023/0264419 A1* 8/2023 Gibson ................. B29C 64/259
700/119

* cited by examiner

3D PRINTER WITH HEAD CARRIAGE WITH FILAMENT CUTTER AND REMOVABLE PRINT HEAD

CROSS-REFERENCE TO RELATED APPLICATION

The present application is based on and claims the benefit of U.S. provisional patent application Ser. No. 63/498,428, filed Apr. 26, 2023, the content of which is hereby incorporated by reference in its entirety.

BACKGROUND

The present disclosure relates to additive manufacturing systems for 3D printing of parts by material extrusion techniques. In particular, the present disclosure relates to a 3D printer with a head carriage with a filament cutter that removably retains a print head therein. All references disclosed herein are incorporated by reference.

Additive manufacturing, also called 3D printing, is generally a process in which a three-dimensional (3D) part is built by adding material to form a 3D part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, powder bed fusion, binder jetting, direct energy deposition, electrophotographic imaging, and vat photopolymerization (including digital light curing and stereolithographic processes).

In a typical extrusion-based additive manufacturing system (e.g., fused deposition modeling systems developed by Stratasys, Inc., Eden Prairie, MN), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print 3D parts using fused deposition modeling techniques. The multi-axis system may include a robotic arm movable in multiple degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to print layers of a 3D part in a single build plane, the geometry of part features may be used to determine the orientation of printing.

As 3D printers begin using tool changers where print heads can be removed during the printing process, there is a need for a head carriage that can be manipulated such that a print head can to be removed for maintenance or replacement and returned to an active state or replaced while the 3D part is being printed. Additionally, there is a need to cut or sever the filament between the supply and the print head so that the filament does not interfere with the removal of the print head.

SUMMARY

An aspect of the present disclosure relates to an extrusion-based 3D printer configured to print 3D parts in a layer-by-layer manner. The 3D printer includes a platen configured to accept and support extruded material, at least one print head configured to extrude material to print a 3D part and a gantry configured to move the at least one print head as the material is extruded. The 3D printer includes at least one head carriage configured to engage the at least one print head. The at least one carriage includes a print head receptacle configured to engage and retain the at least one print head thereto, and a filament cutter positioned above the at least one print head and configured for actuation by a user while the printer is in a paused or off state. The filament cutter includes a blade and a mechanism configured to be moved by the user, such that the blade is positionable between a first, non-cutting position where filament can be fed to the at least one print head and a second, cutting position wherein the filament is cut above the print head.

Another aspect of the present disclosure relates to an extrusion-based 3D printer configured to print 3D parts in a layer-by-layer manner. The 3D printer includes a platen configured to accept and support extruded material, at least one print head configured to extrude material to print a 3D part, and a gantry configured to move the at least one print head as the material is extruded. The 3D printer includes at least one head carriage configured to engage the at least one print head. The at least one carriage includes a head carriage receptacle configured to accept the at least one print head and an actuating lever positionable between a first, clamped position wherein the print head is substantially fixedly retained to the head carriage receptacle and a second, unclamped position wherein the actuating lever disengages the print head from the print head receptacle. The at least one carriage includes a print head receptacle configured to engage and retain the at least one print head thereto, and a filament cutter positioned above the at least one print head and configured for actuation by a user while the printer is in a paused or off state. The filament cutter includes a blade and a mechanism configured to be moved by the user, such that the blade is positionable between a first, non-cutting position where filament can be fed to the at least one print head and a second, cutting position wherein the filament is cut above the print head.

DETAILED DESCRIPTION

The present disclosure relates a 3D printer with a plurality of head carriages that are configured to removably retain a plurality of tools or print heads. The plurality of head carriages are retained in a tool rack when on standby or not in use in the printing process. While in the tool rack, each of the plurality of tools is removable from one of the plurality of head carriages by manipulating an actuating lever on the head carriage. It is also within the scope of the present disclosure that the head carriage and print heads be used in a typical 3D printer with one or more print heads that move in a print plane and the print head indexes upwardly from the print plane when in a standby mode.

The head carriage includes an actuating lever that is positionable between a first, locked position and a second, unlocked position. When the actuating lever is in the first, locked position, the print head or tool is substantially immobilized relative to the head carriage and the print head is electrically coupled to a controller. When the actuating lever is moved to the second, unlocked position, the actuating lever aids in removing the print head or tool from the head carriage and electrically decouples the print head from the controller.

The head carriage includes filament cutter that is located in the tool path between the filament supply and the print head. Typically, the filament cutter is located in the head carriage above the print head where the filament cutter is configured to sever the filament in the filament path above the print head. The filament cutter can include a blade that moves across the filament path or can utilizing a shearing mechanism that causes the filament to be severed in the filament path. The filament cutter can be manually operated with a lever or can be actuated to the cutting position, such as when the actuating lever moves between the first, locked position and the second, unlocked position.

Figure 1:
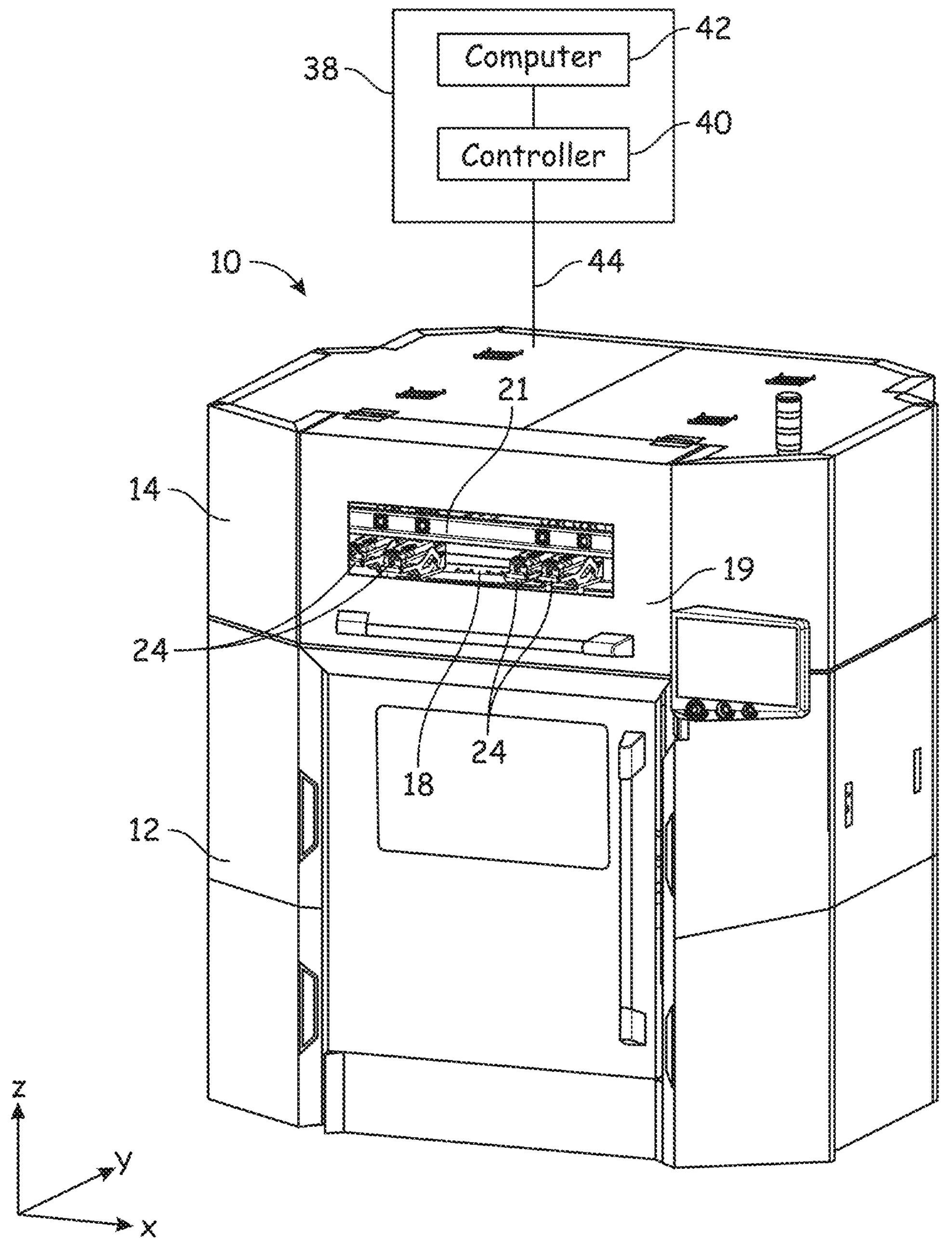
FIG. 1 is a perspective view of an extrusion-based 3D printer of the present invention having a heated build chamber positioned below a tool chamber.
Figure 2:
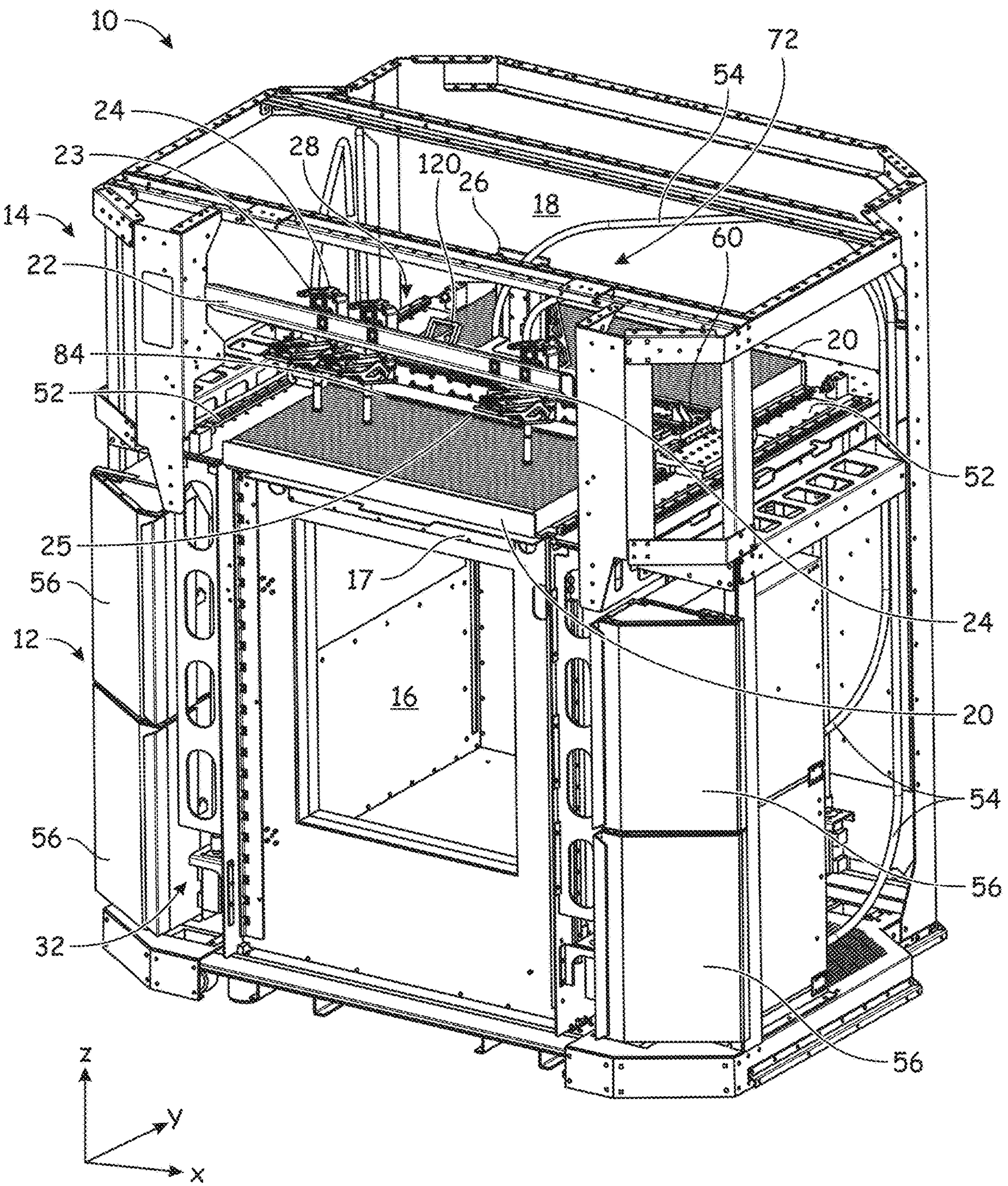
FIG. 2 is a perspective view of portions of the 3D printer shown in FIG. 1, with portions of the frame or cabinet removed to illustrate separation of the build and tool chambers and other features in greater detail.
Figure 3:
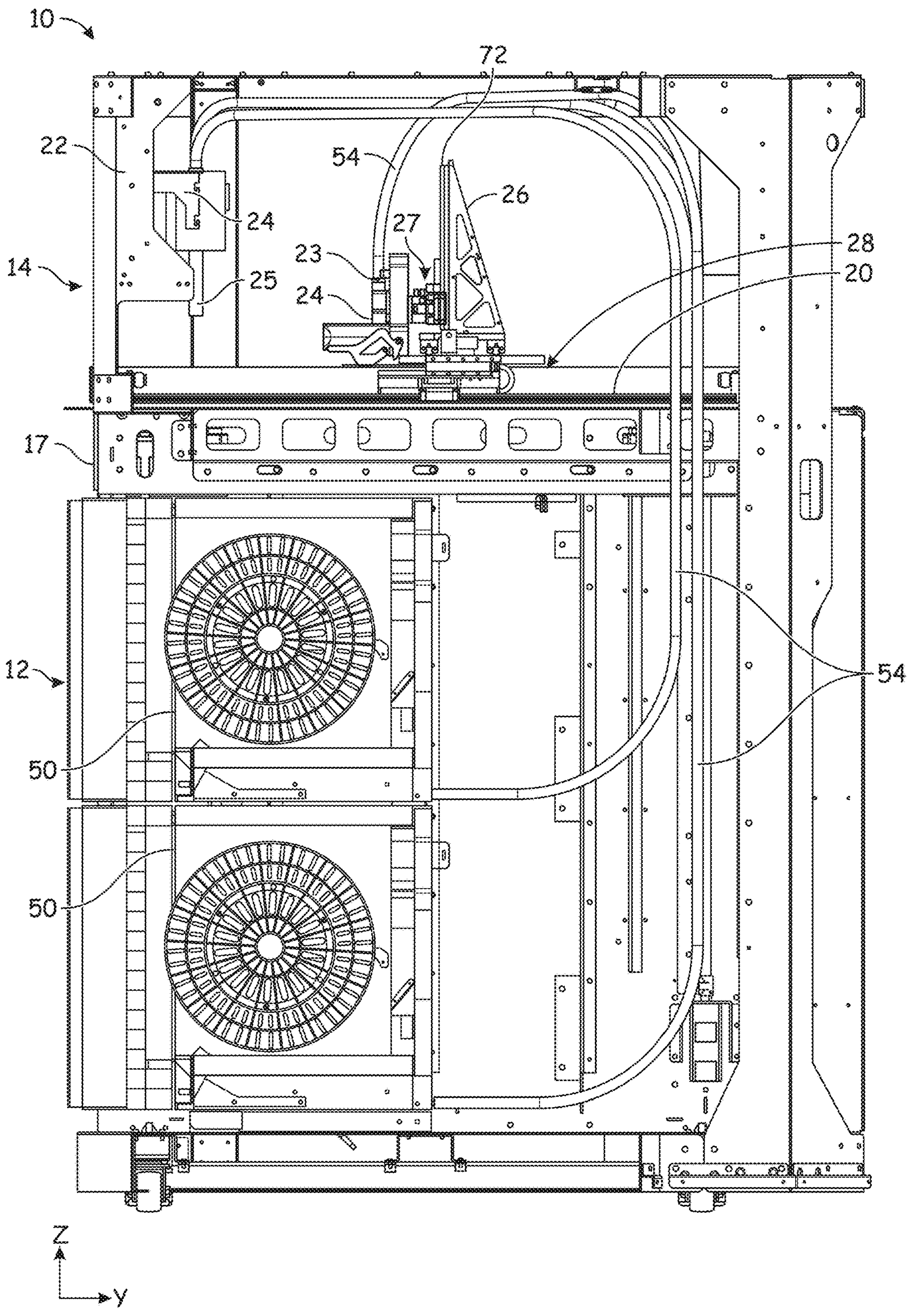
FIGS. 3-5 are views of the 3D printer shown in FIG. 1, illustrating filament spool cabinets, x-y gantry and local Z positioner features, and an insulator separating the build and tool chambers.

The present disclosure may be used with any suitable additive manufacturing system, commonly referred to as a 3D printer. For example, FIGS. 1-5 illustrate a 3D printer 10 having features as discussed above. FIG. 1 is a perspective view of the 3D printer enclosed in cabinets. FIGS. 2-5 are perspective views or side views of the 3D printer with portions removed to illustrate internal features more clearly. As shown initially in FIGS. 1 and 2, 3D printer 10 includes a build chamber cabinet 12 housing a heated build chamber 16 and a tool chamber cabinet 14 housing a separate tool chamber 18, with the tool chamber positioned on top of the build chamber. The tool chamber 18 houses multiple tools, in a tool rack 22, including selectable print heads 24. The 3D printer 10 includes a print head carriage 26 which connects or couples to a selected tool or print head, with an x-y gantry 28 moving the carriage 26 and a selected print head in an x-y plane above a build plane within the heated build chamber 16. The build plane is provided by a platen or platen assembly 30 (shown in FIGS. 4-5) within the build chamber 16, with the platen 30 being moved in a vertical z direction within the build chamber by a platen gantry 32. The tool chamber 18 and heated build chamber 16 are separated by an insulator 20, described below in greater detail, which allows a nozzle 25 of a selected print head 24 to extend from the tool chamber 18 into the heated build chamber 16 such that the build environment can be maintained an elevated temperature while not requiring the same elevated temperature in tool chamber 18. The tool chamber 18 includes a door 19 with a window 21 through which print heads 24 can be viewed and accessed.

In the exemplary embodiment of 3D printer 10, a print head 24 is shown engaged on a tool mount 27 of the carriage and has an inlet 23 for receiving a consumable build material and a nozzle 25 for dispensing the build material onto the platform in a flowable state. The inlet 23 is a rigid member of a filament feed path to the print head 24 from one or more filament spools 50, as described and illustrated in U.S. Provisional Patent Application Ser. No. 63/480,707. The consumable build material is provided to the print head from the one or more filament spools 50 positioned within spool boxes 56 positioned on a side of the build chamber, and through filament guide tubes 54 extending from the spool boxes to the print head.

As shown, the x-y gantry 28 is mounted on top of the build chamber, and in an exemplary embodiment comprises an X-bridge 60, Y-rails 52, and associated X and Y motors for moving and positioning the carriage 26 (and any build tool installed on the carriage) in an x-y plane above the build plane. The carriage is supported on the X-bridge and includes a mount 27 for receiving and retaining print heads and a local Z positioner 72 for controllably moving a retained print head out of the x-y build plane along a perpendicular z direction axis (e.g., not in a pivoting manner). The local Z positioner operates to move a retained print head in a limited Z band of motion from a build position to a tool change position, and in some embodiments may be utilized while the carriage is moving in x-y or when it is in a fixed x-y position. The x-y gantry, as well as the local Z positioner, can utilize any suitable motors, actuators or systems to move the carriage and print head in the x, y and z directions as discussed.

Tool crib or rack 22 is located above the build chamber at a position reachable by the tool mount 27 when elevated by the local Z positioner 72. The tool mount may engage with and support a print head, and is used to retain and swap print heads provided in the rack. In general, any modular tools, such as print heads or any other tools (generally and collectively referred to below simply as "tools") that are removably and replaceably connectable to a 3D printer may be stored in bins of a tool rack for managing tool inventory and interchanging tools during operation of the 3D printer. The local Z positioner 72 is utilized for picking and placing tools in the bins so that the 3D printer can interchangeably use the various modular tools contained in the tool rack. The tool rack may be any suitable combination of containers or other defined spaces for receiving and storing tools.

3D printer 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print head 24, filament drive mechanisms, chamber 16 (e.g., with a heating unit for chamber 16), head carriage 26, motors for platen gantry 32 and x-y or head gantry 28, motors for local Z positioner 72, and various sensors, calibration devices, display devices, and/or user input devices. In some embodiments, controller assembly 38 may also communicate with one or more of platen assembly 30, platen gantry 32, x-y or head gantry 28, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen assembly 30 to a predetermined z height within chamber 168. Controller assembly 38 may then direct x-y gantry 28 to move head carriage 26 (and the retained print head 24) around in the horizontal x-y plane above chamber 16, and direct the local Z positioner 72 to move the head carriage in the z direction relative to the x-y plane, in addition to the platen gantry z movement. Controller assembly 38 may also direct a retained print head 24 to selectively advance successive segments of the consumable filaments from consumable spools 50 through guide tubes 54 and into the print head 24. It should be noted that movements commanded by the controller assembly 38 may be directed serially or in parallel. That is, the print head 24 can be controlled to move along the x, y and z axes by simultaneous directing the x-y gantry 28 and the local Z positioner 72 to re-position the head carriage 26 along each axis.

Figure 4:
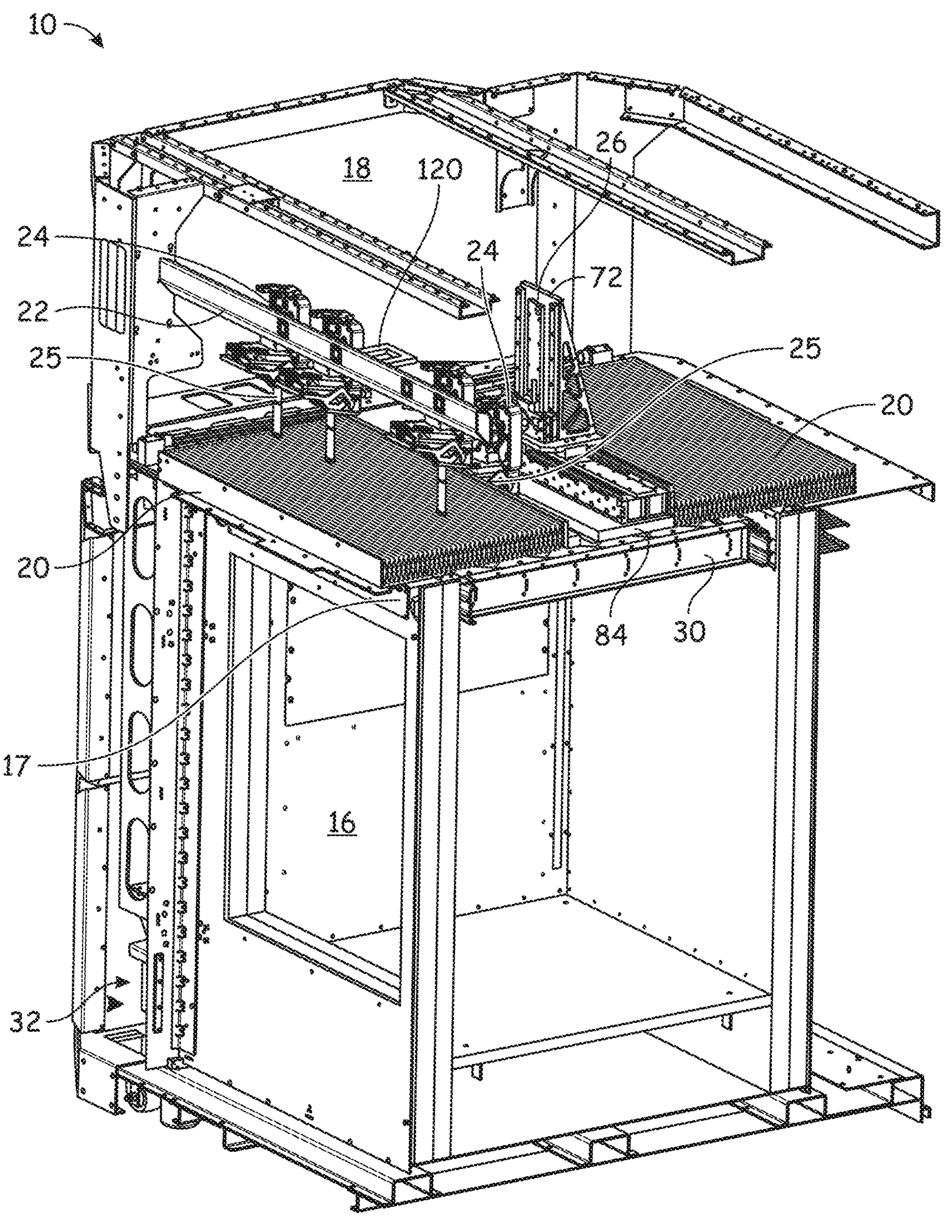
Figure 5:
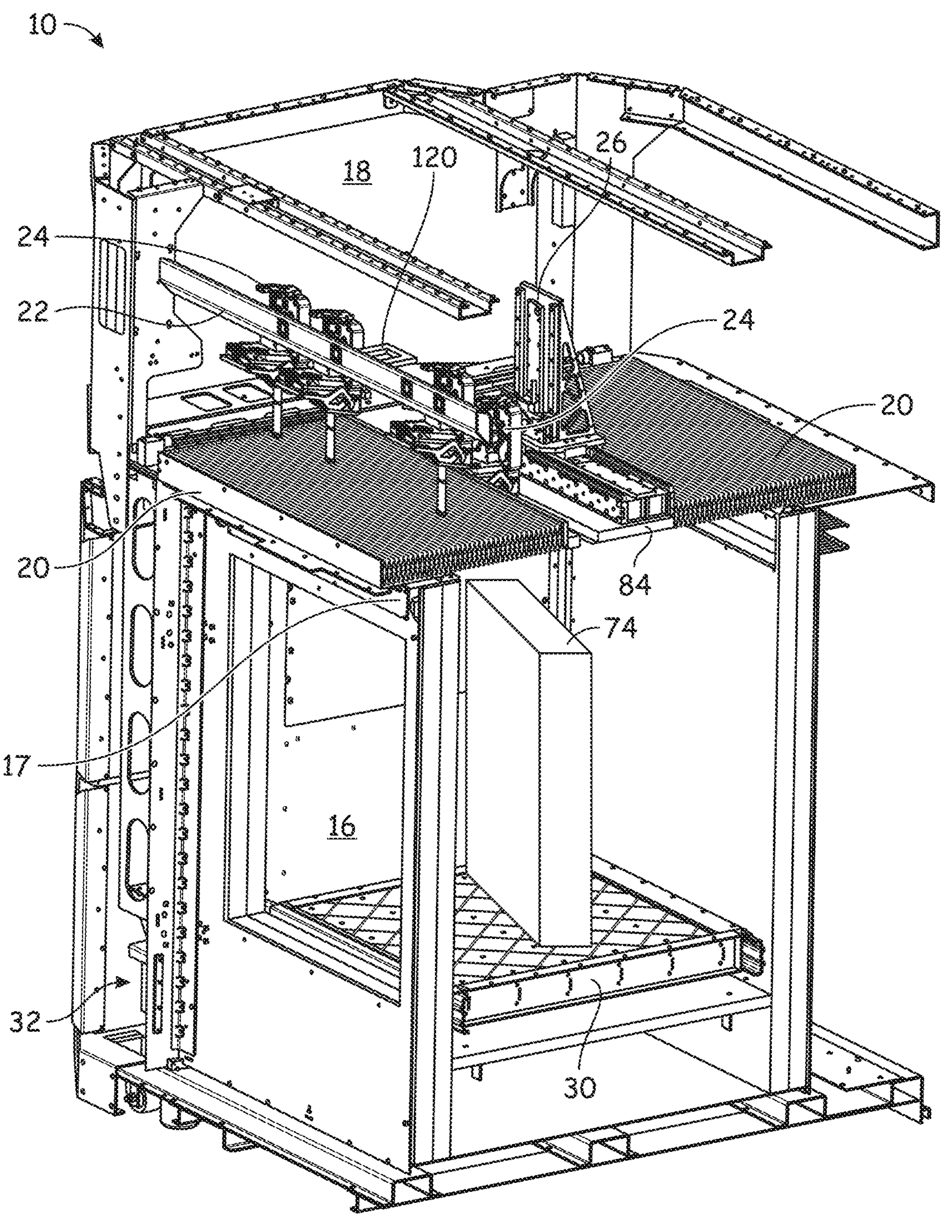

At the start of a build process, the build plane is typically at a top surface of the build platform or platen 30 (or a top surface of a build substrate mounted to the platen) as shown in FIG. 4, where the build platform is positioned to receive an extruded material from the nozzle 25 of the print head. As layers are built, the platen is indexed away from the build plane, allowing printing of a next layer in the build plane. The platen gantry 32, or primary Z positioner, moves the build platform away from the print plane in between the printing of layers of a 3D fabricated part 74 (shown in FIG. 5). One or more parts and associated support structures can be printed in a layer-by-layer manner by incrementally lowering the platen in the z direction. FIG. 5 illustrates portions of 3D printer 10 with the platen 30 at a lowered position, achieved through numerous incremental z direction repositioning steps while printing.

As discussed, the build chamber 16 of the 3D printer may be heated to providing a heated or ovenized build environment, such as in the case of FDM® 3D printers manufactured and sold by Stratasys, Inc. of Eden Prairie, MN. The heated build chamber is provided to mitigate thermal stresses and other difficulties that arise from the thermal expansion and contraction of layered build materials during fabrication, using methods such as are disclosed in U.S. Pat. No. 5,866,058. The insulator 20 shown in FIGS. 2-5 can be a deformable thermal insulator which allows the x-y gantry to move the head carriage 26 and attached print head 24 to move in the x-y plane. An example of a deformable thermal insulator 20 which allows the x-y plane movement is disclosed in Stratasys U.S. Pat. No. 7,297,304. A bellows tray 84 or similar mechanism is provided between sections of the deformable insulator to provide access for the nozzle 25 of the print head into the heated build chamber while aiding in insulating the build chamber from the tool chamber. The bellows tray 84 moves in the y-direction as the x-y gantry 28 moves the head carriage, and the sections of deformable thermal insulator 20 on either side of the bellows tray move or deform accordingly to maintain the thermal insulation between chambers.

Figure 6:
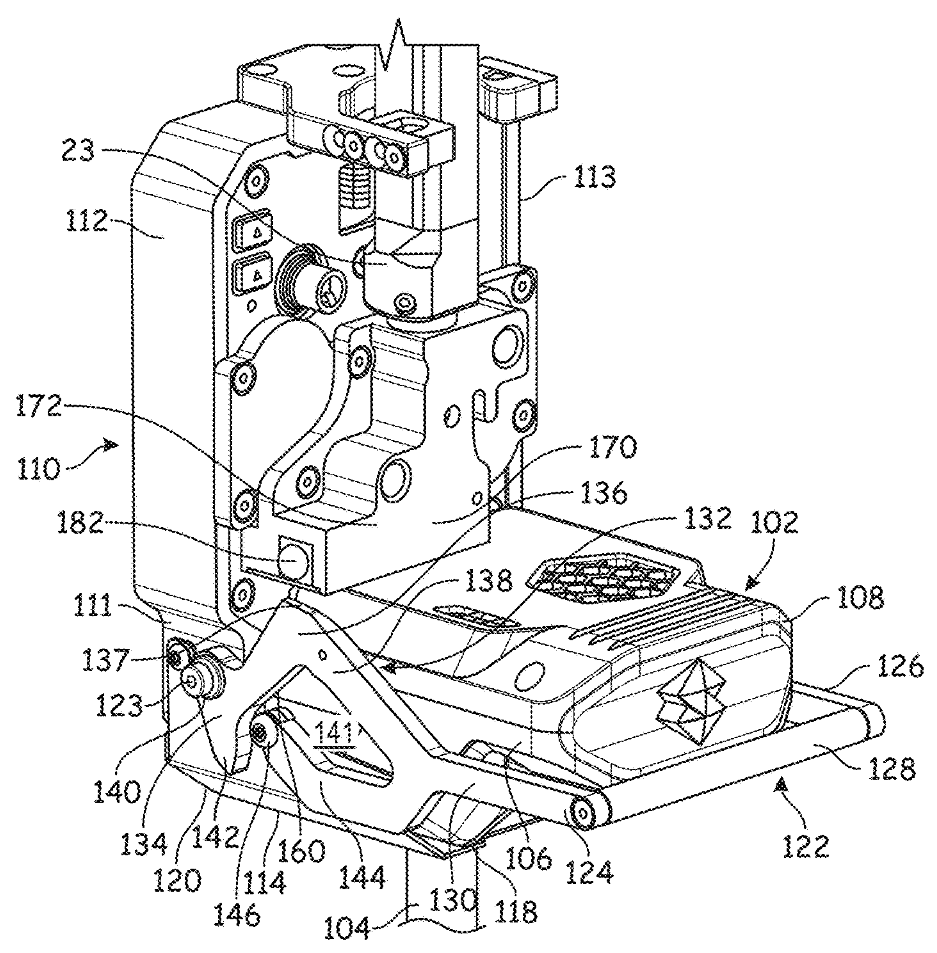
FIG. 6 is a perspective view of a print head retained to a head carriage in a first, clamped position.
Figure 7:
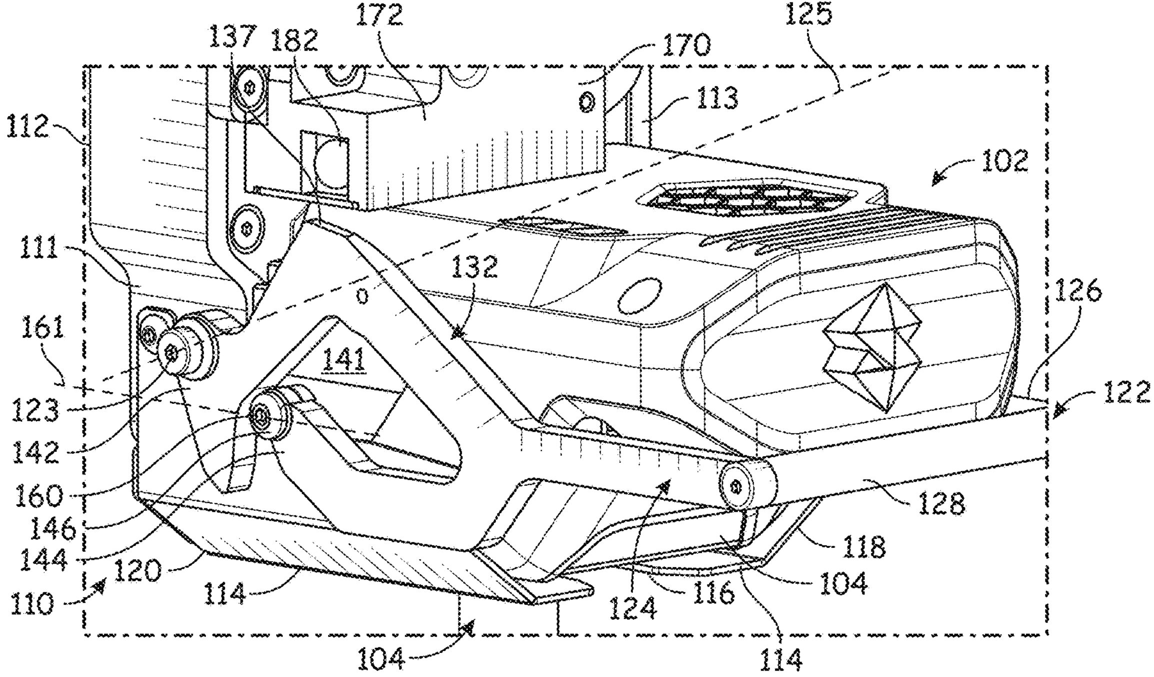
FIG. 7 is an enlarged view of a portion of FIG. 6.
Figure 8:
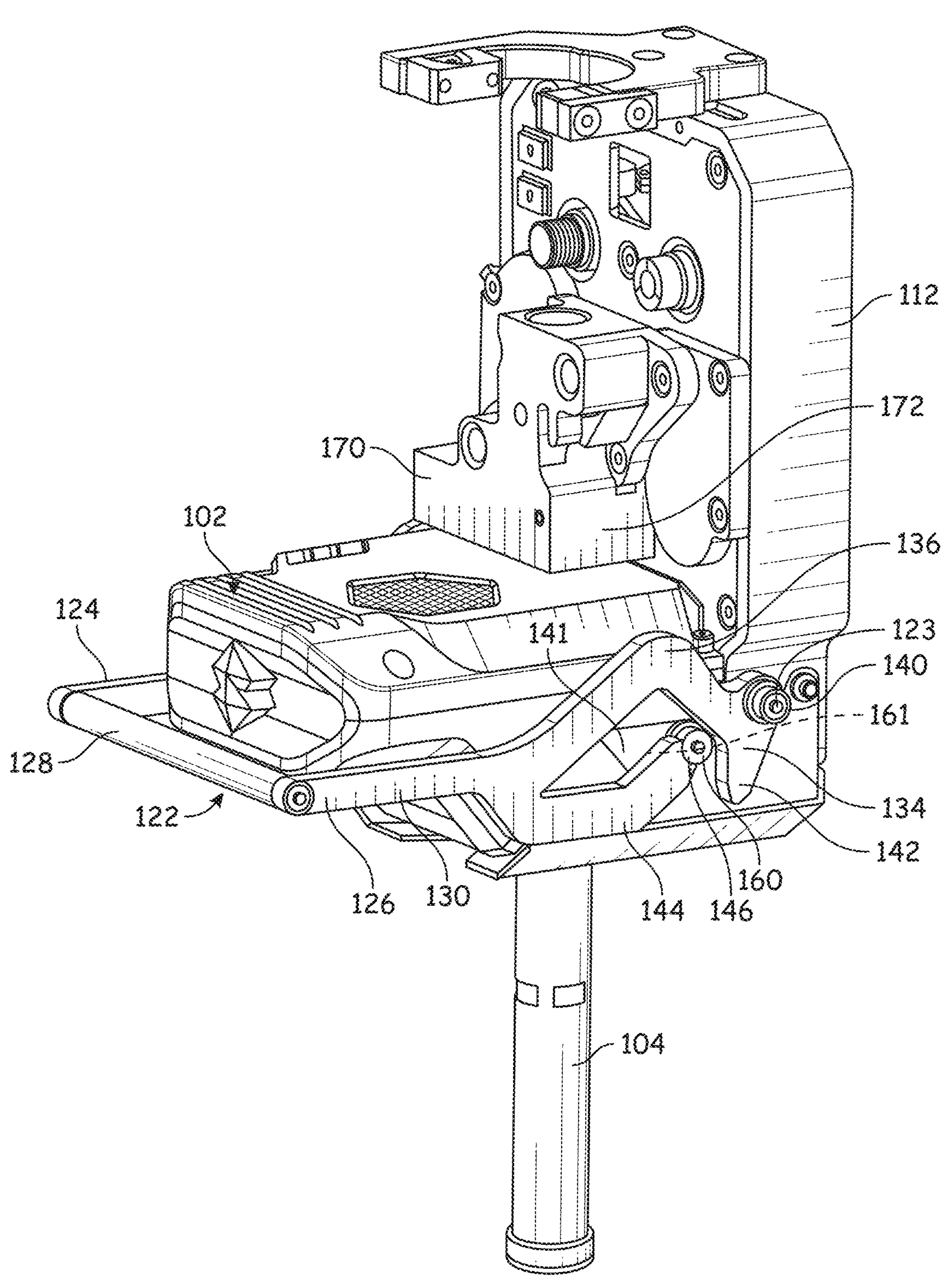
FIG. 8 is a perspective view of the print head in the head carriage in a second, unclamped position.

Referring to FIGS. 6-8, a head carriage 110 retaining a print head 102 is illustrated. The head carriage 110 includes a print head receptacle having a back wall 112 that includes an electrical connector that interfaces with a connector in the print head 102. The head carriage 110 includes a bottom wall 114 that extends from the back wall 112. The back wall 114 includes a slot 116 extending from a front edge 118 toward a back edge 120 where the slot 116 is configured to accept a hot end 104 of the print head 102 that includes a liquefier tube, heating element(s) and an extrusion nozzle.

The head carriage 110 includes an actuating handle 122 that is pivotally attached to opposing side surfaces 111 and 113 of the back wall 112 with threaded bolts 123 that engage threaded cavities in the back wall 112. While a threaded engagement for the pivotal attachment is disclosed, other pivotal connections are within the scope of the present disclosure including fixed rods extending from the head carriage engaging key slots in the actuating handle, rivets and pins with clips or camming members.

The actuator handle 122 includes a left side member 124 and a right side member 126 that are substantially similarly configured and where common elements of the left and right side members 124 and 126 are assigned common reference characters. A handle 128 connects the left side member 124 and the right side member 126 proximate distal ends 125 and 127, respectively. Each of the left and right side members 124 and 126 include a substantially straight portion 130 that leads to an upper portion 132 having a substantially caret shape where an upwardly angled front portion 133 meets with an upwardly angled back portion 134 that join at an apex region 136. The lower portion of the upwardly angled back portion 134 leads to a back portion 138 having an aperture 140 through which the threaded bolt 123 is inserted to pivotally connect the actuating handle 122 to the head carriage 110.

Referring to FIGS. 6-9, the left and right side members 124 and 126 include a discharge arm 142 extending from the back portion 138 at an angle. As the actuating handle 122 is raised upwardly about the pivot axis 125, the angled discharge arm 142 engages a pin 160 extending from left and right side edges 106 and 108 of the print head 102. The continued movement upwardly of the actuating handle 122 causes the angled discharge arm 142 to move and forces the print head 102 away from the back wall 112 of the head carriage. As the print head 102 is moved away from the back wall 112, the electrical connections are broken, the filament is severed or cut and the print head 102 can be easily removed from the head carriage 112 with manual force.

The actuating handle 122 includes a clamping arm 144 extending from the substantially straight portion 130. The clamping arm 144 includes a concave camming surface 146 that is configured to engage the pin 160 and is configured to force the print head toward the back wall 112 of the head carriage and cause an electrical connection to be made. The actuating handle 122 is moved until the camming surface 146 is engaging the pin 160 below a center line 161 or over center such that the actuating handle 122 is in the first, clamping position where the print head is substantially immobile relative to the head carriage 110.

Referring to FIGS. 6-11, the back wall 112 supports a filament cutter 170 that is located above the print head 102 when the print head 102 is secured to the head carriage 110 with the actuating handle 122. The filament cutter 170 includes a main body 172 having a toggle cavity 174 into which a rigid toggle 176 carrying a blade 178 extending from a distal end 180 of the rigid toggle 176. A ball 182 is secured within a cavity 184 in a proximal end 186 of the rigid toggle 176 such that a portion of the ball 182 extends beyond the proximal end 186.

The rigid toggle 176 is biased to a non-cutting position with a compression spring 188 having a distal end 190 positioned in a spring cavity 173 in a wall 175 of the main body 172. A proximal end 192 of the compression spring 188 is positioned in a spring cavity 175 extending into the rigid toggle 176 from the distal end 180. The compression spring 188 biases the rigid toggle 176 into a first non-cutting position where the blade 178 is spaced from a filament path 171 in the filament cutter 170.

The main body 172 include a tab 171 that extends into the toggle cavity 174 were the rigid toggle 176 has a channel 175 that accepts the tab 171. The tab 171 acts as a stop to prevent the rigid toggle 176 from being pushed into the toggle cavity 174 a distance that could damage the blade 178, the rigid toggle 176, the compression spring 188 or the main body 172 of the filament cutter 170.

Figure 10:
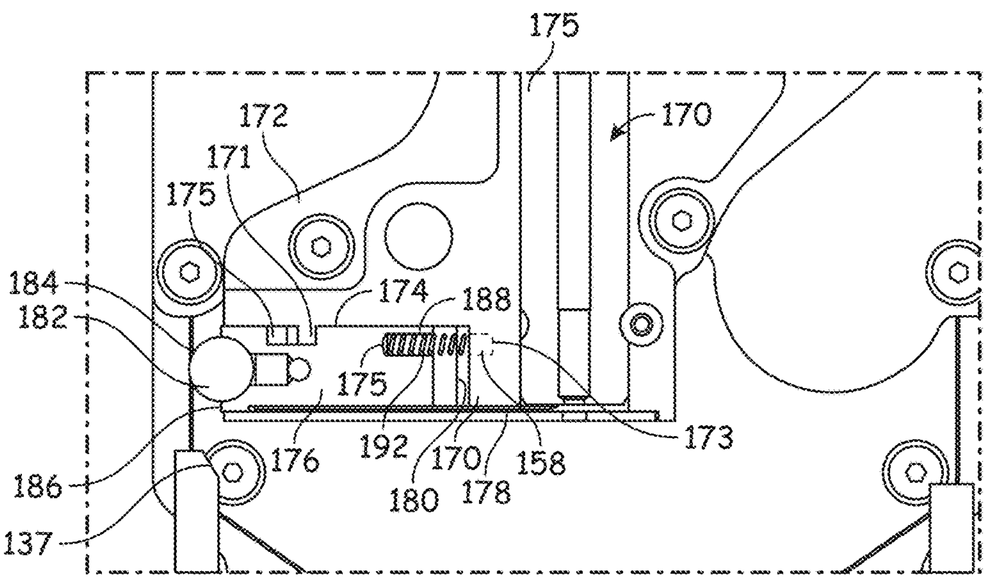
FIG. 10 is a cut away view of a cutting mechanism in a second, cutting position above the print head.
Figure 11:
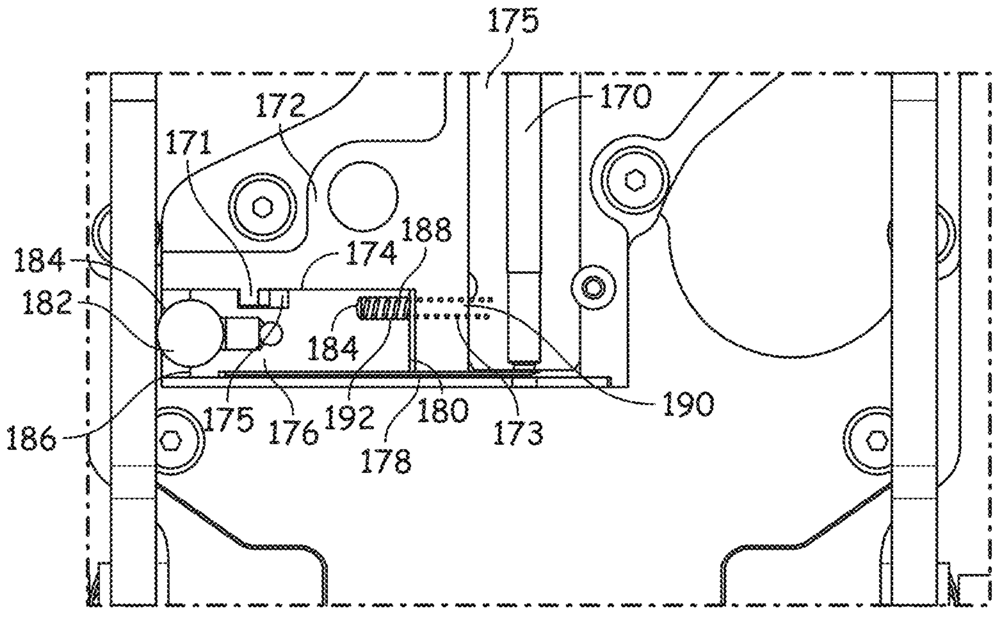
FIG. 11 is a perspective view of print head retained to a head carriage in a first, clamped position with a manually actuated filament cutter above the print head.

To remove a print head from the head carriage 110, the actuating handle 122 is initially in the first, clamping position where the camming surface 146 is engaged with the pin 160 below the centerline 161 or over center, and the filament cutter 170 is in the first, non-cutting position, as illustrated in FIGS. 6-8. The actuating handle 122 is pivoted from the first, clamped position upwardly toward the second, unclamped position which causes the apex region 136 to engage the ball 182 that extends beyond the proximal end 186 of the rigid toggle 176. The apex region 136 includes a wedge portion 137 that engages the ball 182 and causes gradual movement of the ball 180, the rigid toggle 175 and the blade 178 from the first, non-cutting position as illustrated in FIG. 10, to the second, cutting position, as illustrated in FIG. 11, as the ball 180 engages the traveling wedge portion 137 from a thinner region to the full thickness of the apex region 136. The gradual movement of the toggle 176 provides for a more reliable and easier movement from the first, non-cutting position to the second, cutting position where the blade 188 is forced past the filament path 171 as illustrated in FIG. 11, and thereby cuts the filament and prevents the filament from interfering with the removal of the print head from the head carriage 110.

Continued upward movement of the actuating handle 122 causes the actuating handle 122 to disengage the ball 180 where the ball 180 is located in an open space 141 between the upper portion 132 and the clamping arm 144. As the ball 180 disengages from the actuating handle 122, the compression spring 188 biases the rigid toggle 176 back to the first, non-cutting position where the blade 178 is displaced from the filament path 171.

Figure 9:
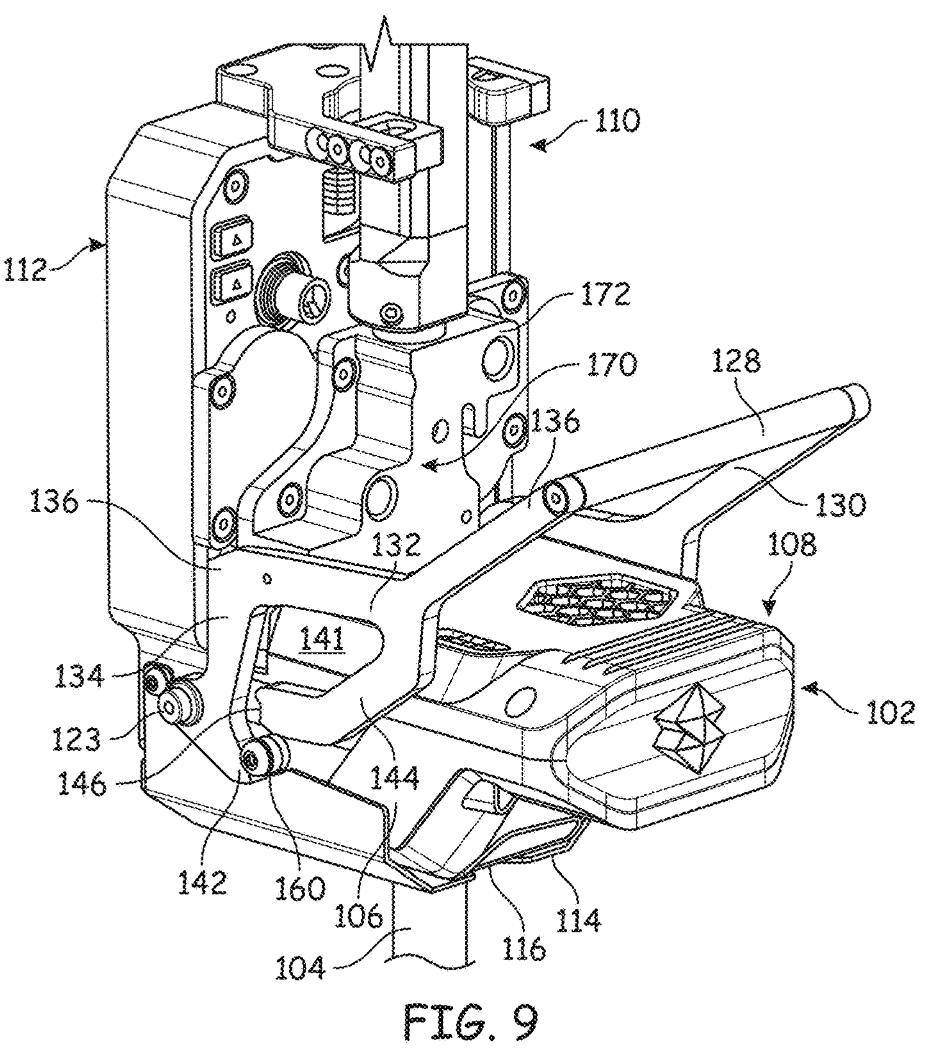
FIG. 9 is a cut away view of a cutting mechanism in a first, non-cutting position above the print head.

Continued upward movement of the actuating handle 122 causes the angled discharge arms 142 to engage a back portion of the pins 160 where continued rotational movement of the actuating handle 122 causes the angled discharge arms 142 to move the print head 102 away from the back wall 112 such that the electrical connections are broken as illustrated in FIG. 9. With the electrical connections disengaged, the filament severed above the print head 102 and the print head 102 moved away from the back wall 112, the print head 102 can be manually removed from the head carriage 110 and be serviced for maintenance and/or repair or replaced with another print head 102.

To return the maintained print head or the replacement print head to the head carriage 110, the actuating handle 122 is moved to the second, non-clamping position and the hot end of the print head is positioned within the slot 116 in the bottom wall 114 such that the hot end of the print head extends below the bottom wall and the print head rests on the bottom wall 114.

With the serviced or new print head 102 positioned in the head carriage 110, the actuating handle 122 is pivoted downward about the bolts 123 where the left side member 124 engages the ball 180 and causes the cutting mechanism 170 to move from the first, non-cutting position while no filament is in the filament path 171. Continued pivotal movement of the actuating handle 122 causes the left side member 124 to disengage from the ball 180, and the cutting mechanism 170 is biased back into the first, non-cutting position where the blade 180 is displaced from the filament path 171, such that filament can be fed into the print head 102.

Continued downward pivotal movement of the actuating handle 122 causes the camming surface 146 of the clamping arms 144 of the left and right side members 124 and 126 to engage the pins 160 and force the print head 102 toward the back wall 112 where electrical connections between the print head 102 and the back wall 112 are aligned. Once the camming surfaces 146 of the clamping arms 144 engage the pins 160, the actuating handle 122 is further pivoted and drives the print head 102 toward the back wall 112 such that the electrical connections are made between the print head 102 and receptacles in the back wall 112. Also, the camming surface 146 of the clamping arms 144 are driven below the center line 161 of the pins 160 such that the print head 102 is in the first, clamped position. With the print head 102 in the first, clamped position, filament can be fed to the print head 102 and the print head 102 can be brought to standby mode while the 3D part or support structures are printed with another print head 102.

Figure 12:
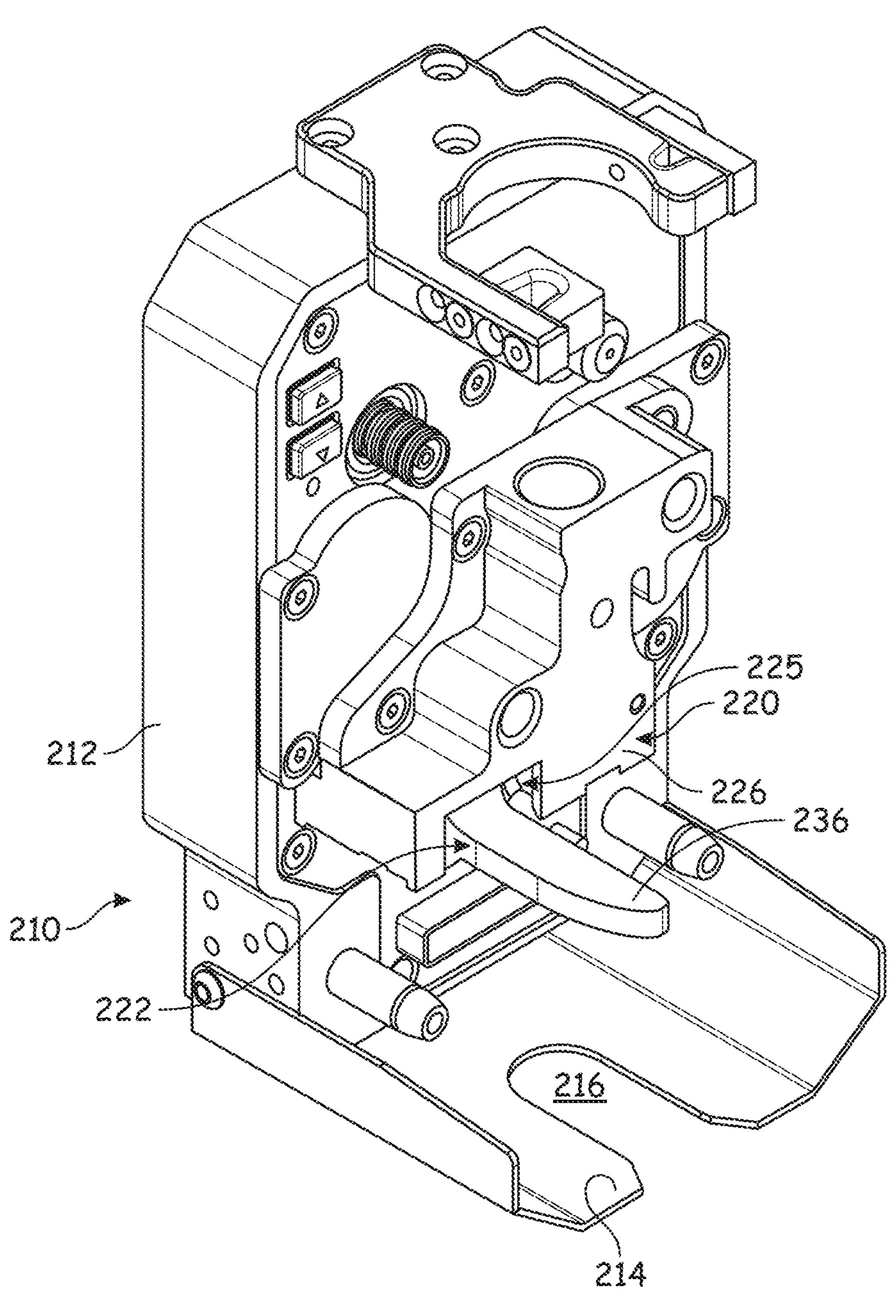
FIG. 12 is a cut away view of the manually actuated filament cutter above the print head.
Figure 13:
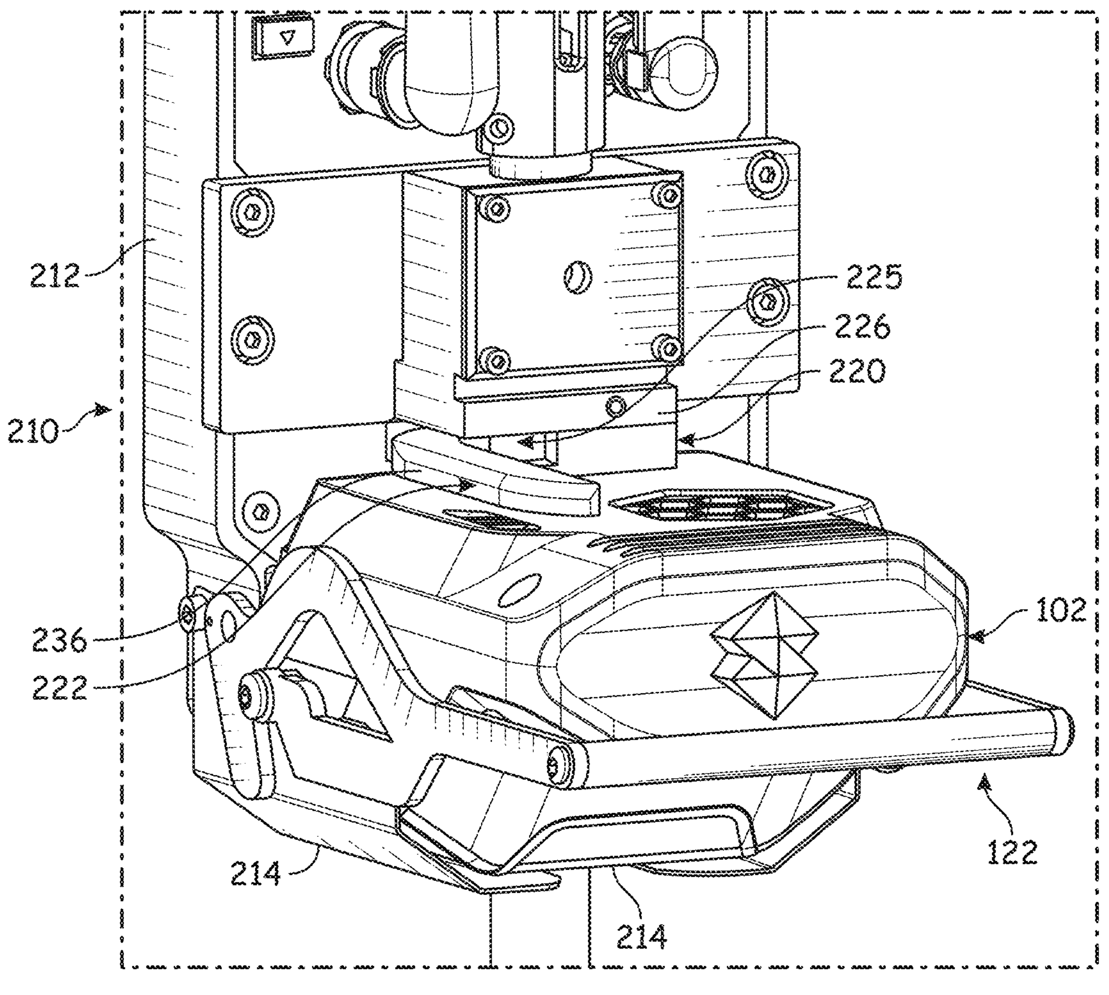
FIG. 13 is a schematic view of the manually actuated filament cutter in a first, non-cutting position.
Figure 14:
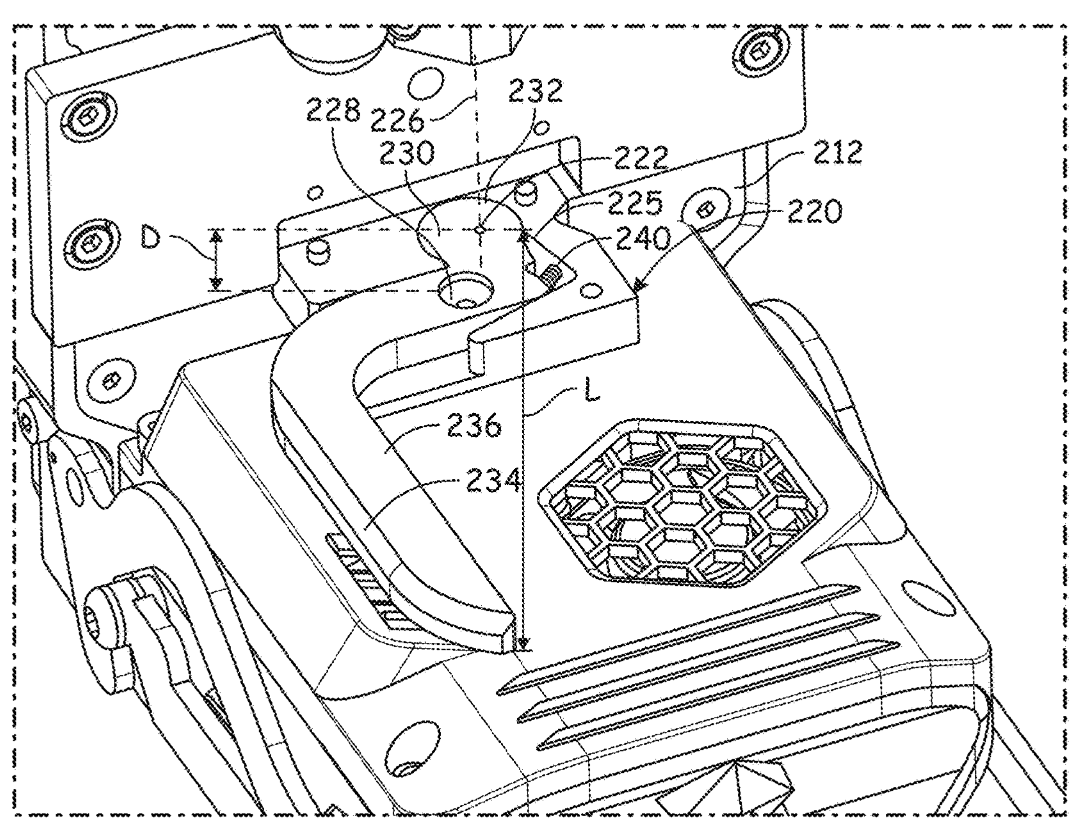
FIG. 14 is a schematic view of the manually actuated filament cutter in an intermediate position.

Referring to FIGS. 12 and 13, in another embodiment, a print head carriage 210 includes substantially the same back wall 212 and bottom wall 214 with the slot 216 and the actuating handle 122 and the print head 102 has substantially the same configuration. However, the filament cutter 220, is different from the filament cutter 170 where the filament cutter 220 includes an actuating mechanism 222 is gripped and manipulated by a user.

Referring to FIGS. 14-22, the filament cutter 220 is attached to the back wall 212 and an actuating mechanism 222 is pivotally attached to a filament cutter housing 224, where a portion of the actuating mechanism 222 positioned with a cavity 225 within the filament cutter housing 224. The actuating mechanism 222 includes a lobe portion 230 that has an arcuate outer surface 232 and a pivot axis 226 that is located substantially at a centerpoint that defines the radius of the arcuate outer surface 232. The actuating mechanism 222 includes a through bore 228 in a region 234 of the actuating mechanism that is spaced from the pivot axis 226 such that as the actuating mechanism 222 is manually pivoted, the surfaces defining the through bore 228 move and sever or cut the filament. The actuating mechanism 222 includes a lever portion 236 that is gripped and moved where a length L of the lever portion 236 and the shorter distance D between the pivot axis 226 and the through bore 228 to create a mechanical advantage that aids in severing or cutting the filament. In some embodiments, the ratio of the length L to the distance D ranges from about 2:1 to about 10:1 and more particularly from about 3:1 to about 5:1.

Figure 15:
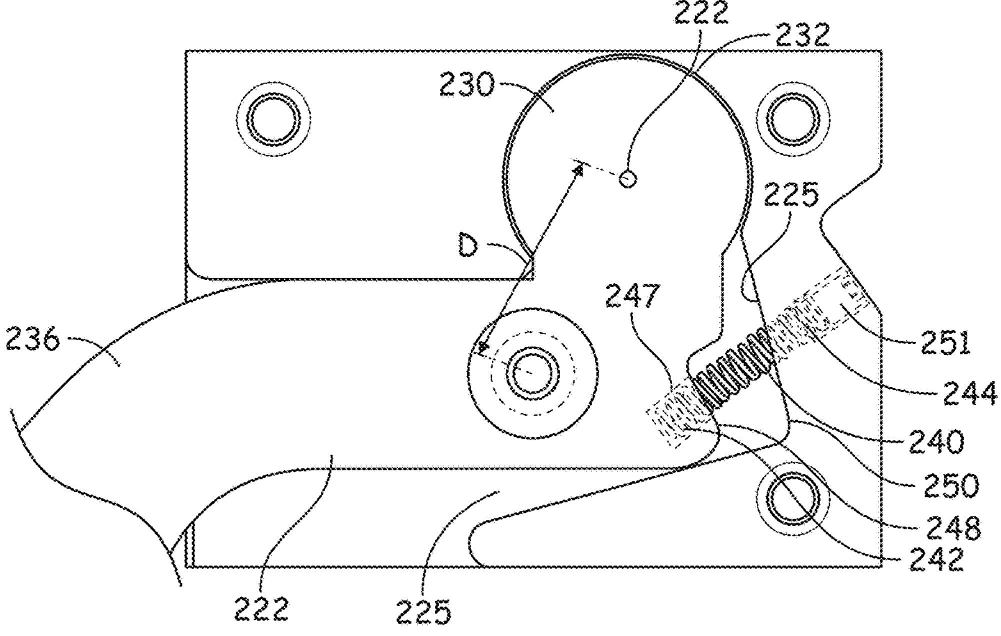
FIG. 15 is a schematic view of the manually actuated filament cutter in a second cutting position.
Figure 16:
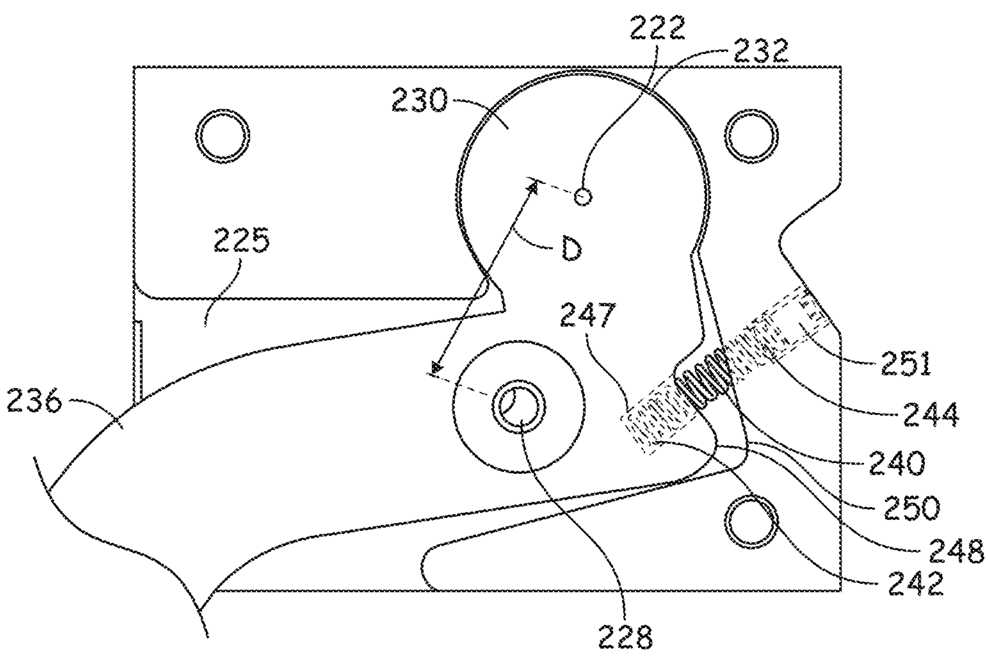
FIG. 16 is a cutaway of the manually actuated filament cutter in the first, non-cutting position.
Figure 17:
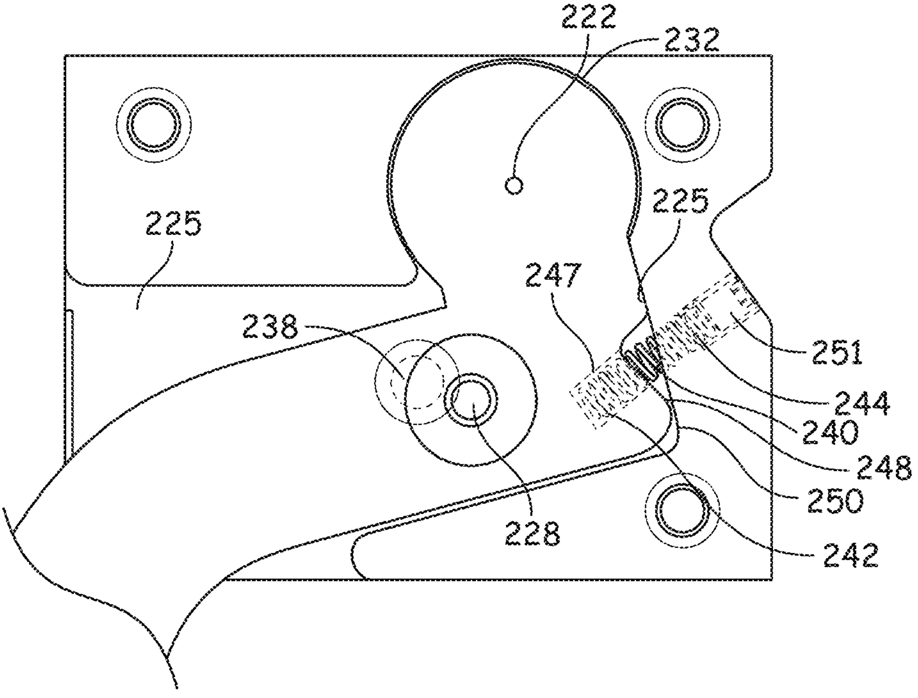
FIG. 17 is a cutaway of the manually actuated filament cutter in the second, cutting position.
Figure 18:
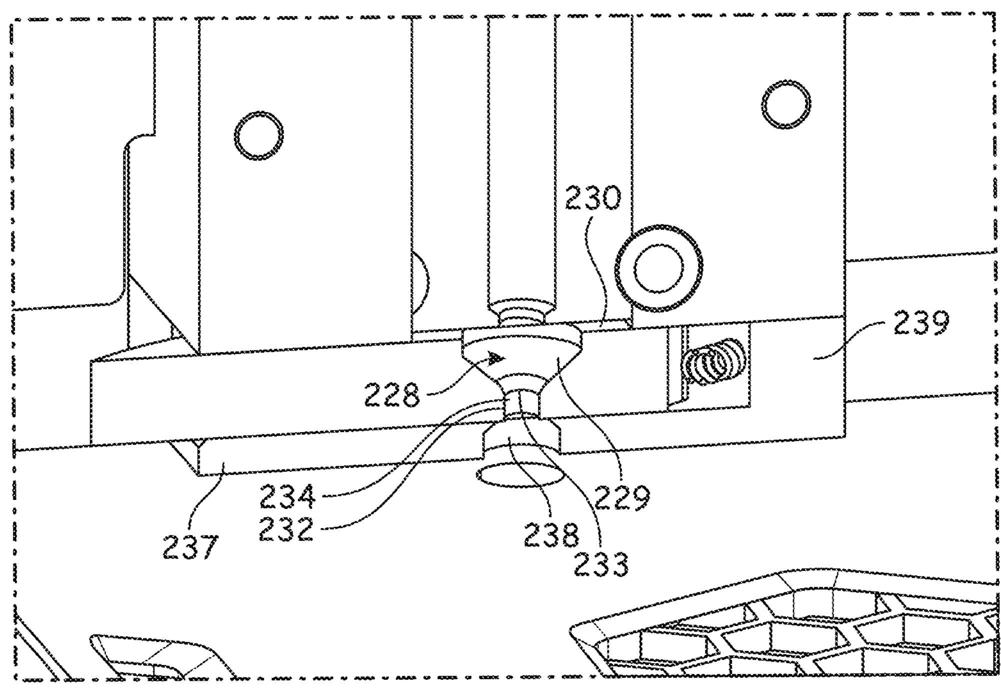
FIG. 18 is a cutaway view of another manually actuated filament cutter in a first, non-cutting position.
Figure 19:
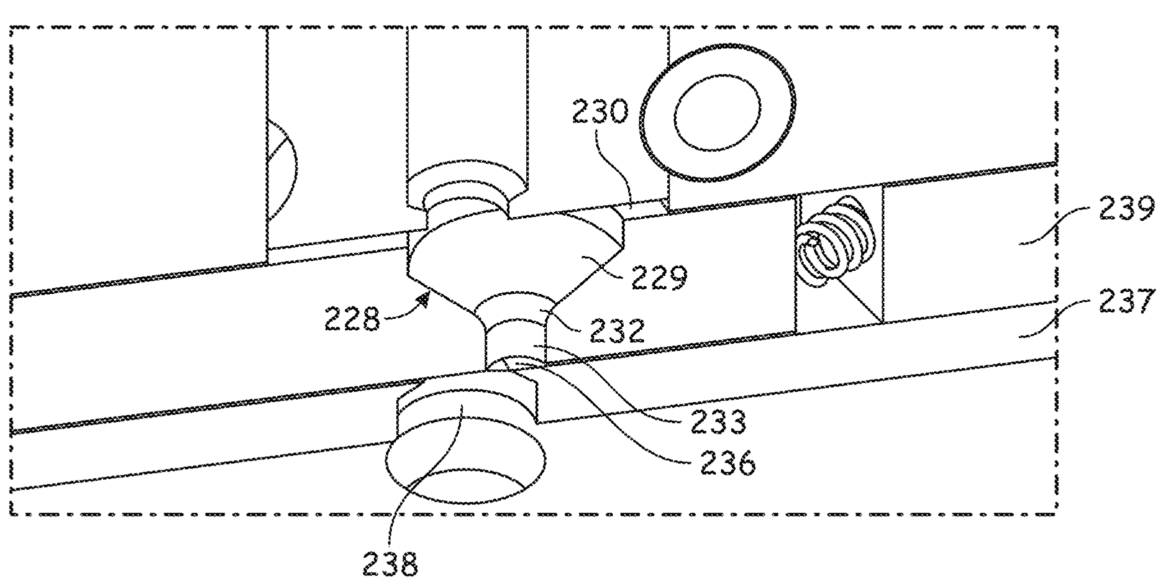
FIG. 19 is a cutaway view of the other manually actuated filament cutter in a second, cutting position.
Figure 20:
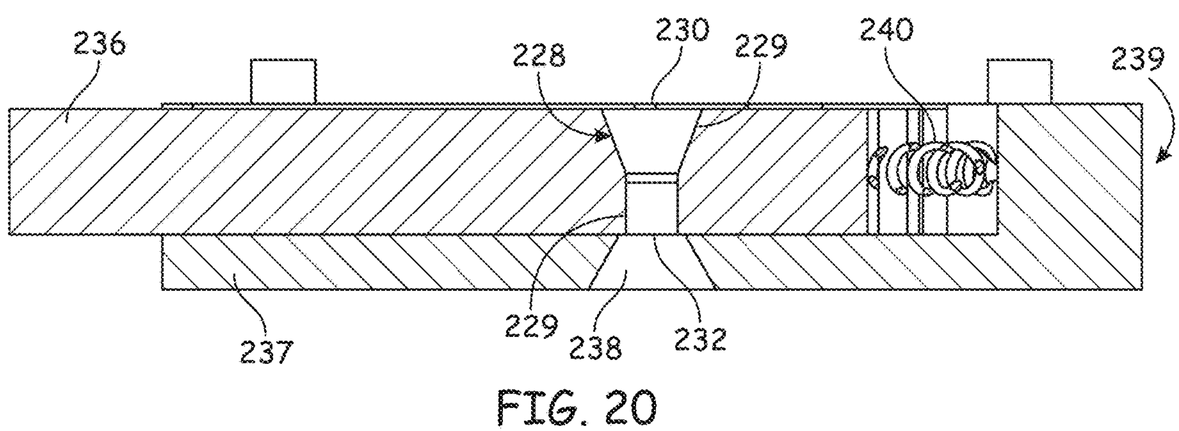
FIG. 20 is a sectional view of the manually actuated filament cutter as illustrated in FIG. 18 in the first, non-cutting position.
Figure 21:
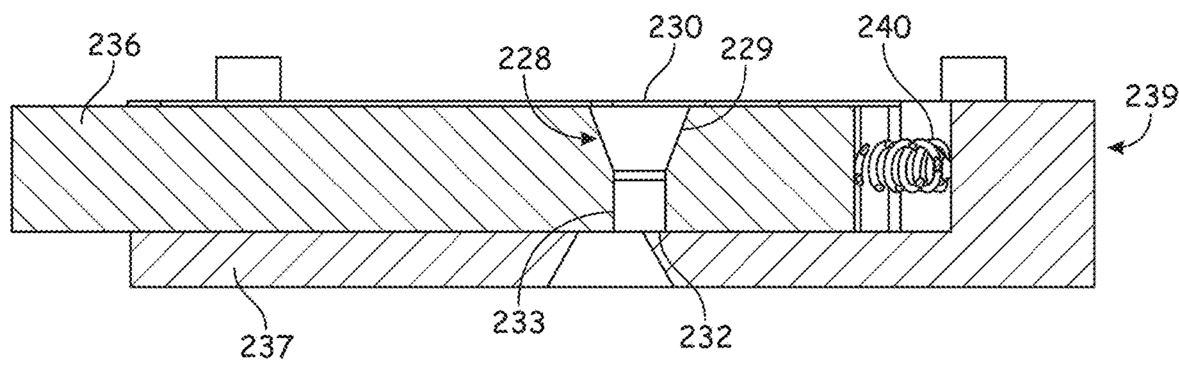
FIG. 21 is a sectional view of the manually actuated filament cutter illustrated in FIG. 18 in an intermediate position between the first, non-cutting position and the second, cutting position.
Figure 22:
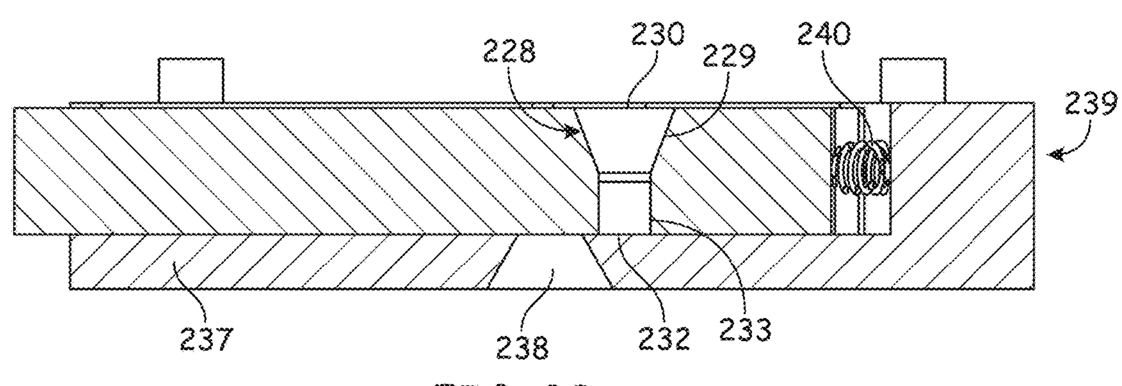
FIG. 22 is a sectional view of the manually actuated filament cutter as illustrated in FIG. 19 is the second cutting position.

The filament cutter 220 includes a compression spring 240 having a proximal end 242 within a cavity 247 in a shoulder 248 on the actuating mechanism 222 and a distal end 244 within a bore 251 in a surface 250 of the cavity. The compression spring 240 biases the actuating mechanism 222 into a first, non-cutting position where the through bore 228 is aligned with the filament path to the print head 102, as illustrated in FIGS. 15, 18 and 20. The through bore 228 has a funnel shaped top portion 229 having an entrance port 230 that tapers to an exit 232 that is smaller than the entrance 230, where the funnel shaped top portion 229 aids in directing the filament into the directing the filament to the exit 232 and prevents interference with the filament as the actuating mechanism is move through an intermediate position, as illustrated in FIGS. 16 and 21, to a cutting position as illustrated in FIGS. 17, 19 and 22. The through bore 228 includes a bottom portion 233 that has a substantially cylindrical configuration that includes an exit port 236 of the through bore 238 that aligns with a static portion 237 of the housing 239.

With the actuating mechanism 222 biased into the first, non-cutting position, the through bore 228 in the actuating mechanism 222 is aligned with the entrance port 238 in the static portion 237 of the housing 239, as illustrated in FIGS. 15, 18 and 20. As manual force is exerted on the lever portion 236 the bias of the compression spring 240 is overcome such that the actuating mechanism 222 rotates and displaces the exit port 236 of the through bore 228 away from the entrance port 238 of the static portion 237 of the housing 239, as illustrated in FIGS. 16 and 21. Continued manual force on the lever portion 236 causes the exit port 238 of through bore 228 to be displaced from the entrance port 238 of the static portion 237 of the housing 239, which causes a scissors action that cuts or severs the filament, as illustrated in FIGS. 17, 19 and 22. Once the filament is severed, the manual force is removed from the lever portion 236 resulting in the compression spring 240 biasing the actuating mechanism 222 in the first, non-cutting position.

With the filament severed, the print head 102 can be removed from the head carriage 210 utilizing the actuator handle 122, as discussed above. Once removed, the print head 102 can be positioned in the first, clamped position using the actuator handle 122, also as mentioned above.

Figure 23:
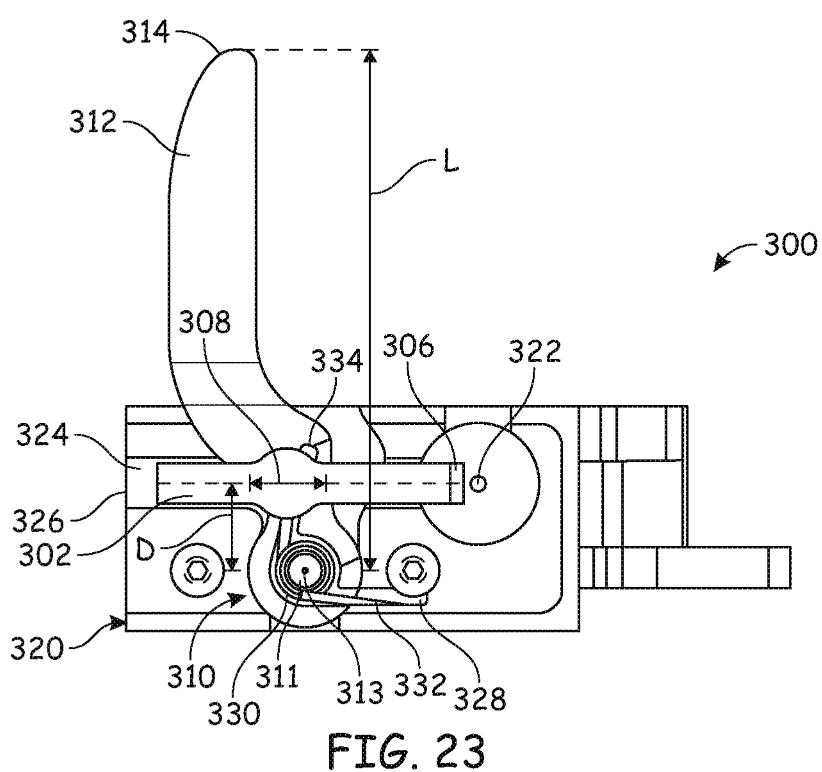
FIG. 23 is a cutaway view of another manually actuated filament cutter in a first, non-cutting position.
Figure 24:
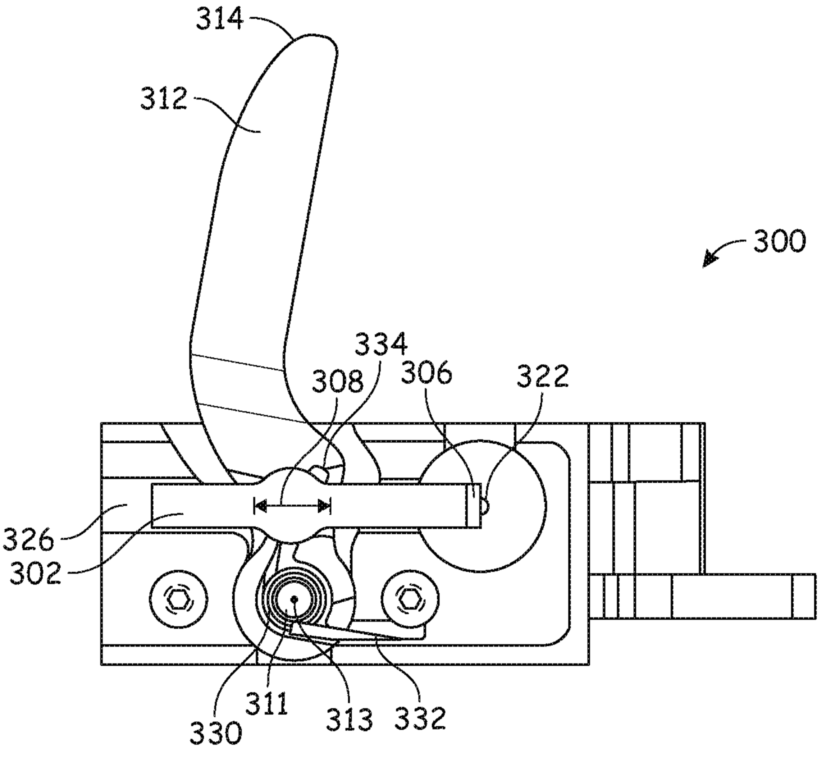
FIG. 24 is a cutaway view of the filament cutter of FIG. 23 in an intermediate position between the first, non-cutting position and a second, cutting position.
Figure 25:
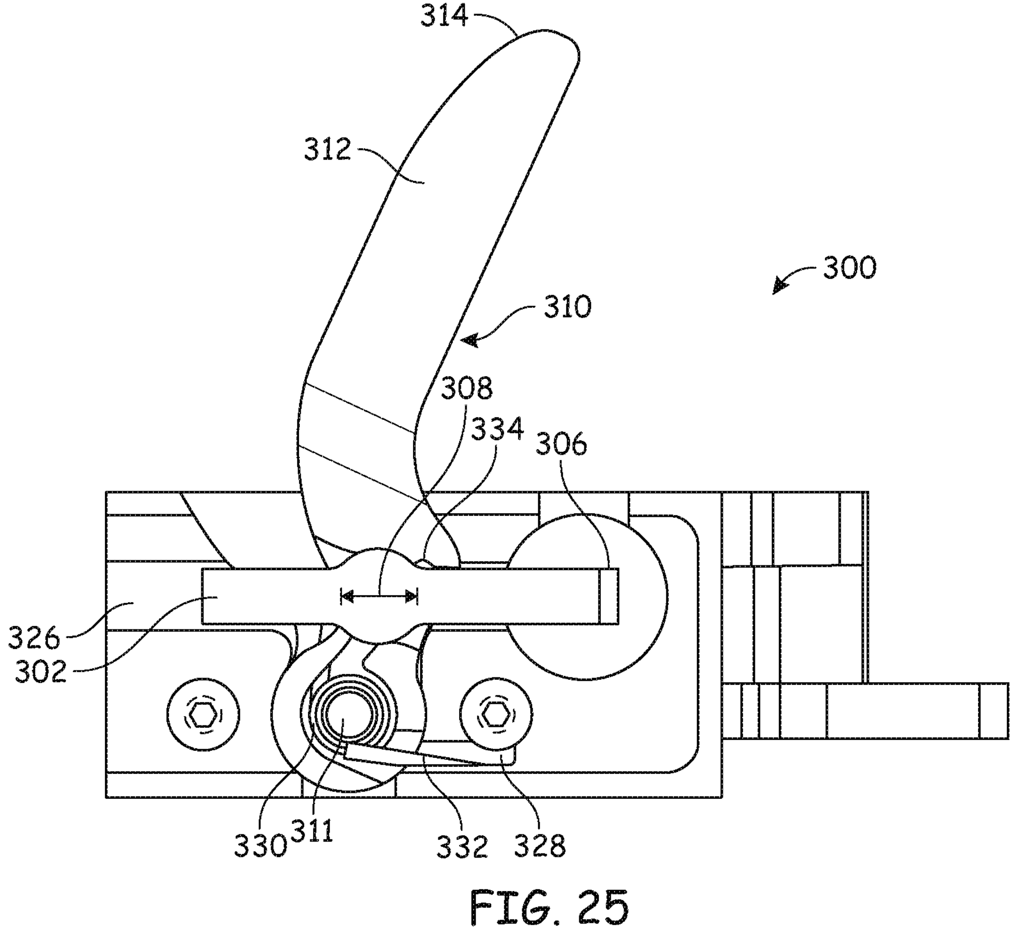
FIG. 25 is a cutaway view of the other manually actuated filament cutter in a second, cutting position.

Referring to FIGS. 23-25, another filament cutter is illustrated at 300. The filament cutter 300 includes a blade 302 that is attached to an actuating mechanism 310 a distance D from a pivotal attachment 311 of the actuating mechanism 310 to a housing 320. The housing 320 includes a through bore 322 that is a portion of the filament path to a print head. The housing 320 includes a channel 324 located from an edge 326 toward the through bore 322 such that the channel 324 guides the movement of the blade 302 in the direction of arrows 308 as the actuating mechanism 310 is moved.

The actuating mechanism 310 includes a lever portion 312 proximate a distal end 314 that is a distance L from the pivotal attachment 311 having a pivotal axis 313. The lever portion 312 is configured to be gripped and moved where a length L of the lever portion 312 and the shorter distance D between the pivot axis 313 and the attachment location of the blade 302 to the actuating mechanism create a mechanical advantage that aids in severing or cutting the filament. In some embodiments, the ratio of the length L to the distance D ranges from 2:1 to 10:1 and more particularly 3:1 to 5:1. The mechanical advantage is proportional to the ration of the L to D, meaning if the mechanical advantage is 4:1 for every pound-force exerted on the lever portion 312 the blade 302 exerts four times the force on the filament.

The filament cutter 300 includes a torsion spring 330 that is positioned about the pivotal attachment 311 where a first end 332 is positioned in a channel 328 in the housing 320 such that the first end 332 is retained therein. A second end 334 of the torsion spring 330 engage the actuating mechanism 310 and biases the actuating mechanism 310 and the blade 302 to a first, non-cutting position, as illustrated in FIG. 23. In the first non-cutting position a cutting edge 306 of the blade 302 is a distance from the through bore 322 such that the blade 302 does not interfere with the filament passing through the through bore 322.

As manual force is applied to the lever portion 312, the cutting edge 306 of the blade 302 is moved into the filament path and begins to overlap with the through bore 322, such that the filament starts to be severed as illustrated in FIG. 24. Continued application of manual force causes the blade 302 and the lever portion 312 to be positioned into the second, cutting position, as illustrated in FIG. 25, where the cutting edge 306 of the blade 302 is located past the through bore, at which time the filament will have been severed or cut.

With the filament severed or cut, manual force is released from the lever portion 312 and the torsion spring 330 biases the actuating mechanism 310 and the blade 330 in the first non-cutting position. With the blade 330 in the first, non-cutting position, the filament can be fed through the through bore 322 and into the print head.

Although the present disclosure may have been described with reference to preferred embodiments, workers skilled in the art will recognize that changes may be made in form and detail without departing from the spirit and scope of the disclosure.

The invention claimed is:

1. An extrusion-based 3D printer configured to print 3D parts in a layer-by-layer manner, the 3D printer comprising:
- a platen configured to accept and support extruded material;
- at least one print head configured to extrude material to print a 3D part;
- a gantry configured to move the at least one print head as the material is extruded; and
- at least one head carriage configured to engage the at least one print head, the at least one carriage comprising:
  - a print head receptacle configured to engage and retain the at least one print head thereto; and
  - a filament cutter positioned above the at least one print head and configured for actuation by a user while the printer is in a paused or off state, wherein the filament cutter comprises:
    - a blade comprises a through bore having an exit surface, wherein the through bore comprises a first diameter at the exit surface;
    - a fixed surface aligned with the exit surface of the through bore; and
    - a mechanism configured to be moved by the user such that the blade is positionable between a first, non-cutting position where filament can be fed to the at least one print head through the through bore and a second, cutting position wherein the filament is cut above the print head by moving the blade relative to the fixed surface, wherein as the blade is moved to the second, cutting position, a scissors cutting action is generated between the exit surface and the fixed surface.

2. The extrusion-based 3D printer of claim 1, wherein the filament cutter is biased into the first, non-cutting position.

3. The extrusion-based 3D printer of claim 1, wherein the mechanism configured to be moved by the user comprises:
- a handle that is configured to be gripped and moved with manual force from the first position to the second position wherein as the handle is moved from the first position to the second position the blade is moved from the first, no-cutting position to the second, cutting position utilizing a mechanical advantage.

4. The extrusion-based 3D printer of claim 3, wherein the mechanical advantage ranges from about 2:1 to about 10:1.

5. The extrusion-based 3D printer of claim 3, wherein the mechanical advantage ranges from about 3:1 to about 5:1.

6. The extrusion-based 3D printer of claim 1 and wherein the print head receptacle of the at least one head carriage comprises:
- a bottom wall configured to support a print head;
- a back wall extending from the bottom wall; and
- an actuating lever positionable between a first, clamped position wherein the print head is substantially fixedly retained to the head carriage and a second, unclamped position wherein the actuating lever disengages the print head such that the print head can be removed while another print head of the at least one print heads is printing the 3D part or the associated support structure.

7. The extrusion-based 3D printer of claim 6, wherein the back wall of the print head receptacle comprises an electrical receptacle.

8. The extrusion-based 3D printer of claim 7, wherein the at least one print head comprises a mating electrical connector configured to couple to the electrical receptacle, wherein when in the first, clamped position the electrical receptacle and the mating connector are in electrical communication and when in the second, unclamped position the electrical receptacle and the mating connector are disconnected.

9. The extrusion-based 3D printer of claim 1 and further comprising,
- a heated print chamber containing the platen;
- a tool chamber separated from the heated print chamber with a thermal barrier;
- a tool rack within the tool chamber, wherein the tool rack is configured to retain a plurality of print heads secured to a plurality of head carriages.

10. The extrusion-based 3D printer of claim 1, wherein the mechanism configured to be moved comprises:
- a handle that is configured to be gripped and moved with manual force from the first position to the second position wherein as the handle is moved from the first position to the second position the blade is moved from the first, non-cutting position to the second, cutting position utilizing a mechanical advantage.

11. The extrusion-based 3D printer of claim 10, wherein the mechanical advantage ranges from about 2:1 to about 10:1.

12. The extrusion-based 3D printer of claim 10, wherein the mechanical advantage ranges from about 3:1 to about 5:1.

13. The extrusion-based 3D printer of claim 1 and wherein the blade comprises an entrance surface to the through bore, wherein the through bore comprises a second diameter at the entrance surface, wherein the second diameter is larger than the first diameter.

14. The extrusion-based 3D printer of claim 13, wherein the through bore comprises a funnel shaped portion between the entrance surface and the exit surface.

15. An extrusion-based 3D printer configured to print 3D parts in a layer-by-layer manner, the 3D printer comprising:

a platen configured to accept and support extruded material;

at least one print head configured to extrude material to print a 3D part;

a gantry configured to move the at least one print head as the material is extruded; and at least one head carriage configured to engage the at least one print head, the at least one carriage comprising:

a head carriage receptacle configured to accept the at least one print head;

an actuating lever positionable between a first, clamped position wherein the print head is substantially fixedly retained to the head carriage receptacle and a second, unclamped position wherein the actuating lever disengages the print head from the print head receptacle; and a filament cutter positioned above the at least one print head and configured for actuation by a user while the printer is in a paused or off state, wherein the filament cutter comprises:

a blade comprising a through bore having an exit surface, wherein the through bore comprises a first diameter at the exit surface;

a fixed surface aligned with the exit surface of the through bore; and a mechanism configured to be moved by the user such that the blade is positionable between a first, non-cutting position where filament can be fed to the at least one print head through the through bore in the blade and a second, cutting position wherein the filament is cut above the print by moving the blade relative to the fixed surface, wherein as the blade is moved to the second, cutting position, a scissors cutting action is generated between the exit surface and the fixed surface.

16. The extrusion-based 3D printer of claim 15, wherein the filament cutter is biased into the first, non-cutting position.

17. The extrusion-based 3D printer of claim 15 and further comprising, a heated print chamber containing the platen;

a tool chamber separated from the heated print chamber with a thermal barrier;

a tool rack within the tool chamber, wherein the tool rack is configured to retain a plurality of print heads secured to a plurality of head carriages.

18. The extrusion-based 3D printer of claim 15 and wherein the blade comprises an entrance surface to the through bore, wherein the through bore comprises a second diameter at the entrance surface, wherein the second diameter is larger than the first diameter.

19. The extrusion based printer of claim 18, wherein the through bore comprises a funnel shaped portion between the entrance surface and the exit surface.

* * * * *